(12) United States Patent
MacDonald

(10) Patent No.: US 8,777,680 B2
(45) Date of Patent: Jul. 15, 2014

(54) SNOWMOBILE CONVERSION KIT FOR AMPHIBIOUS SERVICE

(76) Inventor: Kenneth James MacDonald, Malakwa (CA)

( * ) Notice: Subject to any disclaimer, the term of this patent is extended or adjusted under 35 U.S.C. 154(b) by 102 days.

(21) Appl. No.: 13/158,047

(22) Filed: Jun. 10, 2011

(65) Prior Publication Data

US 2012/0315812 A1 Dec. 13, 2012

(51) Int. Cl.
*B60F 3/00* (2006.01)
(52) U.S. Cl.
USPC ........................................ 440/12.56
(58) Field of Classification Search
USPC .............................. 440/12.56, 95–97; 114/123
See application file for complete search history.

(56) References Cited

U.S. PATENT DOCUMENTS

| 3,611,979 | A | 10/1971 | Hebert |
| 3,646,904 | A | 3/1972 | Lanning et al. |
| 3,707,938 | A | 1/1973 | Olson |
| 3,785,330 | A | 1/1974 | Fox |
| 4,204,582 | A | 5/1980 | van Soest |
| 4,737,390 | A | * | 4/1988 | Fricano et al. ............... 428/34.2 |
| 4,893,692 | A | 1/1990 | Smith |
| 5,988,090 | A | * | 11/1999 | Barker, Jr. ..................... 114/123 |
| 6,062,156 | A | 5/2000 | Radke et al. |
| 6,139,378 | A | 10/2000 | Kufahl |
| 6,505,694 | B2 | 1/2003 | Maguire |
| 6,595,812 | B1 | 7/2003 | Haney |

FOREIGN PATENT DOCUMENTS

FR 2565907 12/1985

* cited by examiner

*Primary Examiner* — Edwin Swinehart
(74) *Attorney, Agent, or Firm* — Bennett Jones LLP

(57) ABSTRACT

A kit for conversion of a snowmobile for use as a personal watercraft by replacement of the skis with steerable flotation 'device' and addition of outrigger flotation 'device' to suspend the track in the water while providing flotation to the chassis, along with the flotation provided by the steerable flotation 'device'. The kit installs to the snowmobile without removing the track or engine drive, and without interference with operator control systems. Wheels may be included in keels of some hulls to allow for ease of access and egress from water to land.

14 Claims, 5 Drawing Sheets

SNOWMOBILE CONVERSION KIT FOR AMPHIBIOUS SERVICE

FIELD OF THE INVENTION

The present invention relates generally to extending the use of recreational vehicles designed for winter use in snow, such as a snowmobile, so that the vehicle may be used on water. It is an aim of the invention to permit the use of a snowmobile as a personal watercraft through the use of easy-to-install accessory flotation devices to the vehicle, using simple mounting and adjustment mechanisms, and without complex or cumbersome drive-adapters or other peripheral devices or modifications.

BACKGROUND OF THE INVENTION

Tracked recreational vehicles for use on snow and winter terrain have been known for some time, and for nearly as long there has been a perceived need to provide for ways to use them on water, either as watercraft or for safety in travel over frozen bodies of water where there is a danger of breaking through the ice and submerging (see for example U.S. Pat. No. 3,646,904 to Lanning et al., which describes an early snowmobile with flotation and water drive means).

U.S. Pat. No. 6,595,812 to Haney solves the problem by providing a drive-in boat hull, into which a snowmobile may be inserted and sealed for use over water, the boat hull providing flotation, which leave the skis in place and provide for amphibious (water, snow and ice) operation of the conjoined vehicle. The skis are provided with additional surface area to act as forward steering elements while waterborne, and the track is used to provide propulsion in both water and over snow and ice. By attempting to convert to an amphibious vehicle, performance as a watercraft is compromised with a high-drag broad single hull and awkward steering components, the complexity of a series of water-tight seals, and the like.

U.S. Pat. No. 4,893,692 to Smith makes a snowmobile approaches the problem of safety when a rider breaks through ice and falls into the water, by including waterproof hull components and skis with pontoon-like flotation characteristics to provide buoyancy in the event of such an accident. This vehicle is not designed as a watercraft for recreational purposes, but rather as a snow craft with buoyancy for safety purposes.

U.S. Pat. No. 3,611,979 to Hebert discloses the replacement of mechanical suspension elements with a resilient flotation casing (bladder-like bag) disposed between two endless drive tracks to provide a small, buoyant amphibious vehicle for use over snow and ice, and water. This vehicle compromises suspension system performance for waterborne flotation, among other problems.

U.S. Pat. No. 3,646,904, as noted above, discloses a set of two pontoons with mounting arrangements onto which a partially disassembled snowmobile can be bolted, and which can attach the pontoons' included propeller and rudder systems to the engine and operator control systems, respectively, of the snowmobile; this provides a pleasure watercraft powered by the snowmobile's engine, but requires removal of the snowmobile's track, and complex connections of the engine and steering controls to additional propeller and rudder systems on the pontoons.

U.S. Pat. No. 6,062,156 to Radke et al. discloses a snowmobile—powered watercraft with floats for skis and a massive bolt-on U-shaped rear float which surrounds the snowmobile, enclosing its rear-end. The rear enclosure (the joining part of the "U" shaped hill, behind the vehicle between the two side parts of the hull, one each side of the vehicle) provides an adjustable trim tab, added bulk, and unnecessary weight, manufacturing complexity, drag, and a single point of failure.

SUMMARY OF THE INVENTION

To mitigate some of the problems with the prior art, this system provides for in a first aspect, the present invention provides:

1. A flotation device to replace the ski or each ski if several are included of a recreational vehicle to provide buoyancy to the front of the vehicle as well as to provide steering while the vehicle is in motion;
2. A set of flotation devices adjustably mounted to the sides of the vehicle, rearward of the front flotation device(s), to provide buoyancy to the rear of the vehicle while leaving at least a portion of the lower part of the vehicle's track in contact with the water when the vehicle is waterborne, in order that the track can be operated to power the vehicle's motion through and over the water.

The flotation device(s) replacing the ski(s) can be equipped with one or more integrated or removable wheels in the flotation device's lower-most part for amphibious operation, or simply for ease of loading and unloading the vehicle to and from the water.

The flotation device(s) can be pointed at their front-most ends, and can be of any hydrodynamically useful hull shape or form.

The mounting bracket(s) for the front flotation device(s) are designed to be compatible with the mounting elements by which the ski(s) replaced by the device(s) are attached to the vehicle's steering system.

The mounting brackets for the rear flotation devices may be attached to holes drilled in the tunnel of the vehicle via an arm or arms which attach the two flotation devices together, parallel to each other, aligned longitudinally with the front-to-rear axis of the vehicle; the arms can be threaded through the track and vehicle suspension before being attached to both of the flotation devices, and then attached to the vehicle near the bottom of the vehicle's tunnel. Means can be included on the arms and/or by drilling additional holes in the sides of the tunnel, to adjust the height of the vehicle above the bottom of the flotation devices—this can adjust the angle of attack of the vehicle and its disposition in the water when idle and in use under powered motion.

The arms may be made of 2"×2" square aluminum tubing, or of any other suitable material or dimensions.

The rear mounting of the flotation devices may be accomplished by welding or otherwise attaching or forming a plate to each side of each arm, each spaced to be directly beside the inside vertical wall of the tunnel, one per side, to be bolted to the tunnel through holes in the brackets which mate with holes in the tunnel. Other mounting methods may alternatively be used.

The flotation devices of the invention may be all the same size, and thus interchangeable, or they may be of different sizes between the front and back sets.

The flotation devices can be made using any suitable means of making boat-like hulls. In an embodiment, they are made by thermally setting a plastic to match a mold of the device's shape, filling the thermally set plastic hull shape with suitable foam, making an upper or lid part of suitable material to seal to the hull shape's upper and outer edges, to provide structural rigidity to the device itself, and to provide mounting points for the hardware by which the device is to be attached to the vehicle. The hull(s) and lid(s) may be of any suitable material and color, and should be sealed or filled with foam to avoid taking on water and maintain buoyancy. The lid may have a non-slip top surface for part or all of its area.

In operation, the rear flotation devices will provide sufficient buoyancy to hold the vehicle sufficiently out of the water so that, at rest, the lower part of the vehicle's track is in the water and the vehicle's motor, passenger seat, passenger are out of the water; when operated at speed over water, the hull shape of the rear flotation devices may plane or otherwise rise out of the water to some extent, which will act to raise the vehicle and its track with respect to the water's surface—this is to be controlled to keep the track in contact with the water in order to enable the track to provide motive power to the vehicle, and control is effected by the initial placement of the flotation devices with respect to the vehicle's track, its weight and the hull displacement of the flotation devices, and the amount of rise or vertical change in location of the flotation device with respect to the water surface when the vehicle and hulls are moving in the water at various speeds.

In operation, at rest the front flotation device(s) will provide buoyancy to the vehicle in the water sufficient to keep the vehicle from sinking and wetting the passenger, engine, and other undesirable parts of the vehicle; and when in motion through the water, the front flotation device(s) will provide buoyancy and lift to keep the vehicle afloat and at an appropriate or desired attitude (pitch) to the water, while also providing steering control to the vehicle's operator by turning the vehicle in response to the operator causing the flotation device(s) to turn (rotate roughly on the plane of the water surface about their attachment point and act as steering rudders or elements controlled by the operator using the steering mechanisms of the vehicle), all in a predictable and repeatable way.

BRIEF DESCRIPTION OF THE DRAWINGS

Embodiments of the present invention will now be described, by way of example only, with reference to the attached Figures, wherein.

DETAILED DESCRIPTION

Figure 1:
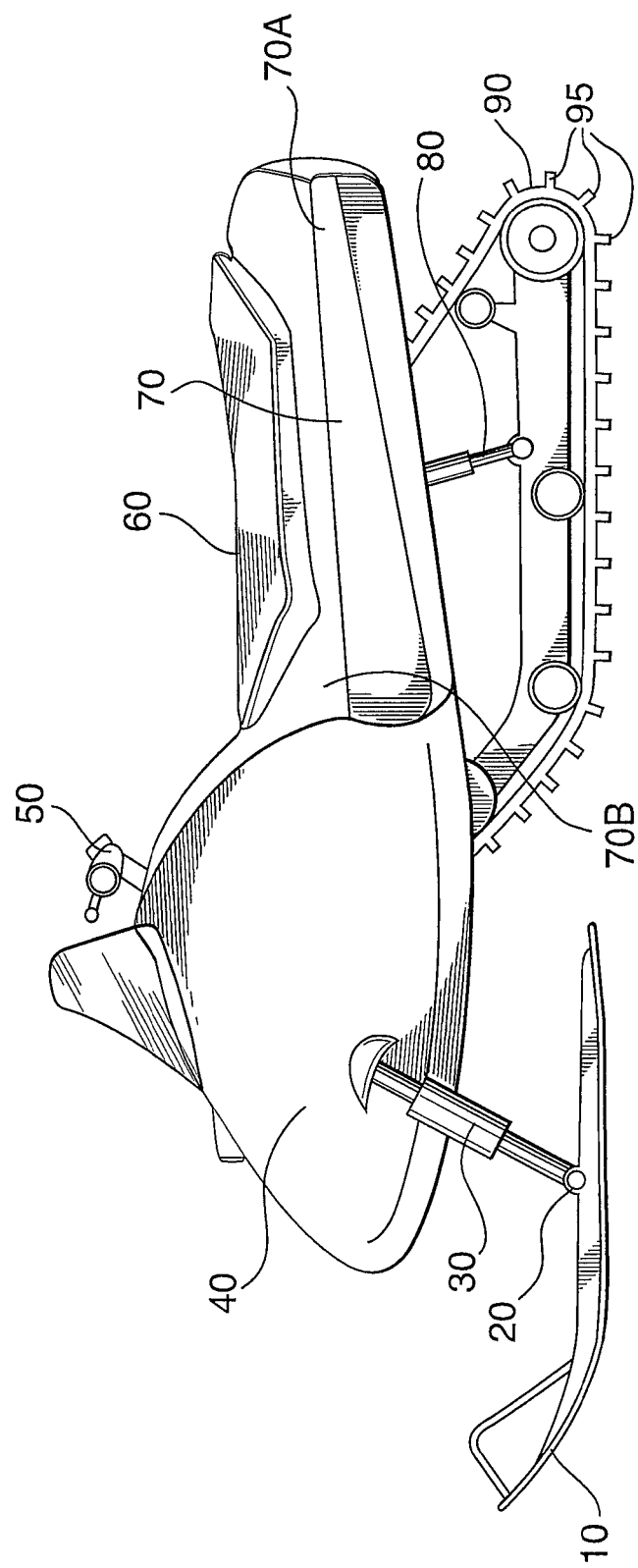
FIG. 1 is a pictorial side elevation of the Left Hand Side of a tracked recreational snow vehicle, illustrating typical components and parts of the type of vehicle, not to scale.
Figure 2:
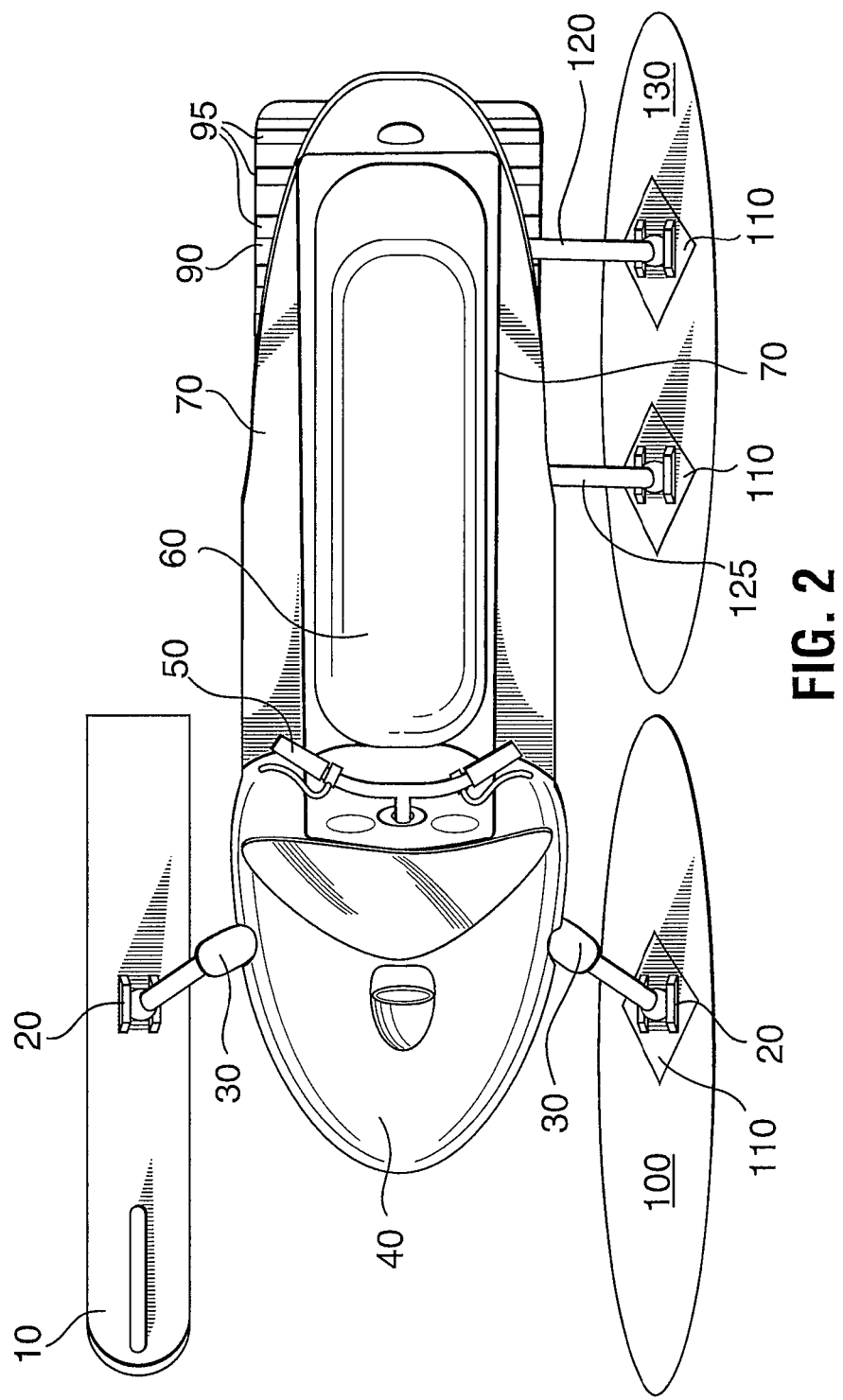
FIG. 2 is a pictorial top elevation of a tracked recreational snow vehicle, illustrating on its Right Hand Side the typical configuration of such a vehicle for use in snow, and illustrating on its Left Hand Side an exemplary configuration of this invention.
Figure 3:
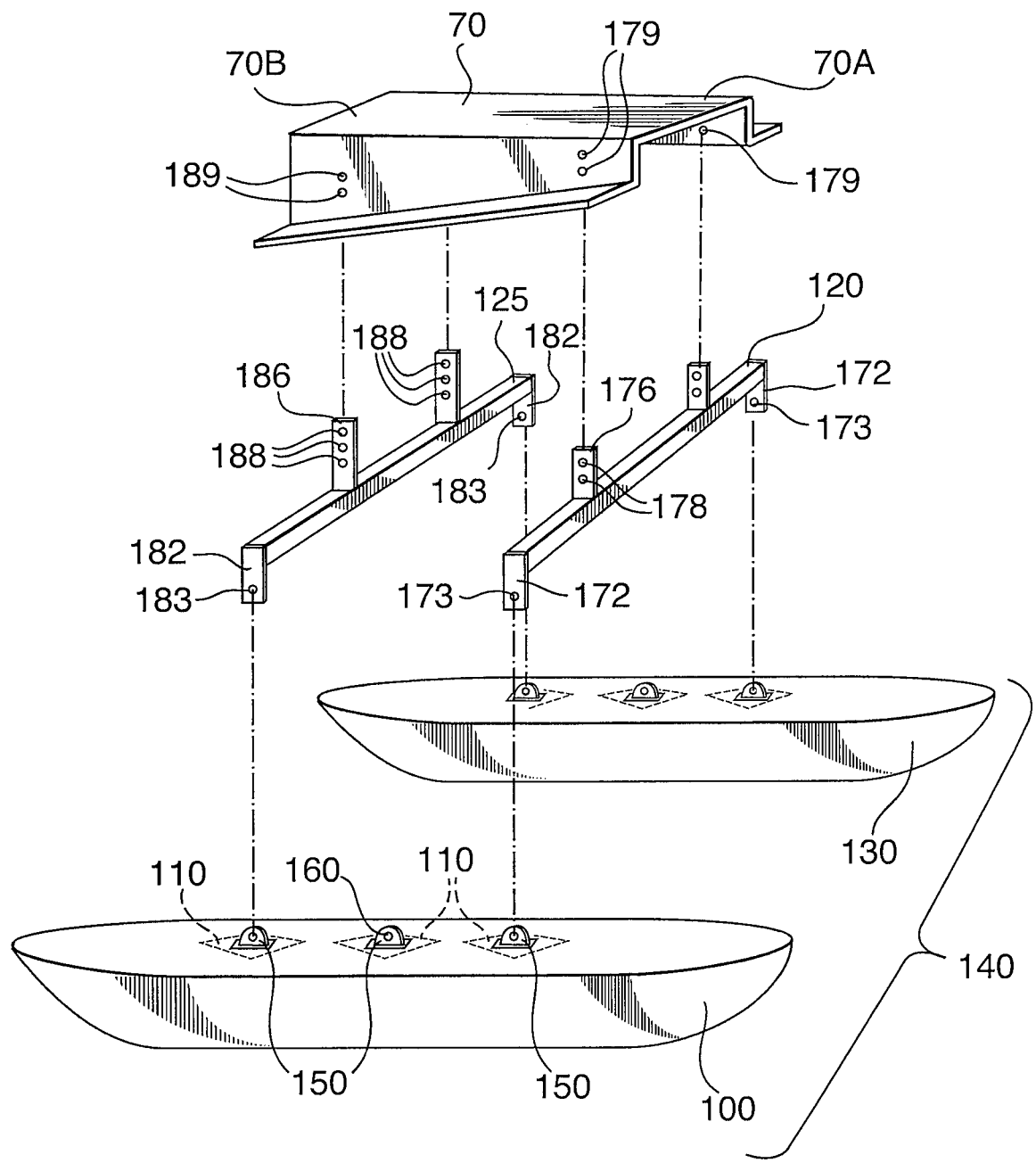
FIG. 3 is an exploded pictorial perspective, not to scale, of an exemplary pontoon, rear mounting elements, and the tunnel or chassis element of a typical tracked recreational snow vehicle.
Figure 4:
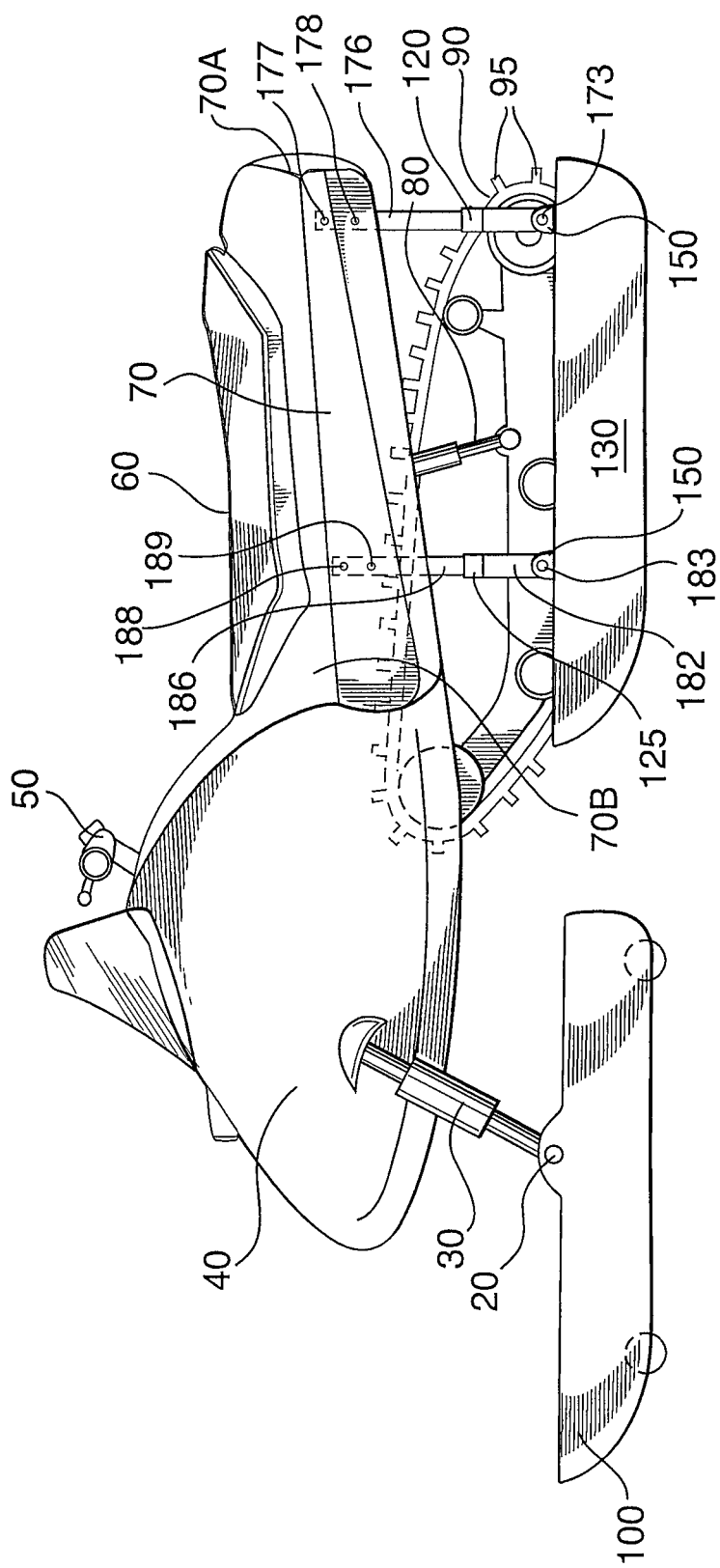
FIG. 4 is a pictorial side elevation of the Left Hand Side of a tracked recreational snow vehicle showing the pontoons of the invention installed, not to scale.
Figure 5A:
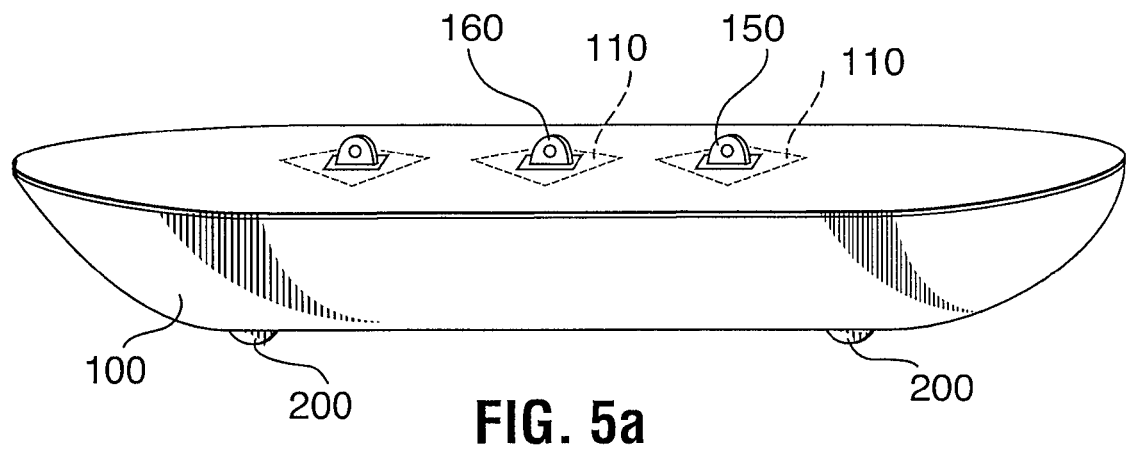
FIG. 5a is a pictorial perspective elevation of an exemplary forward pontoon of the invention showing optional keel-mounted wheels.
Figure 5B:
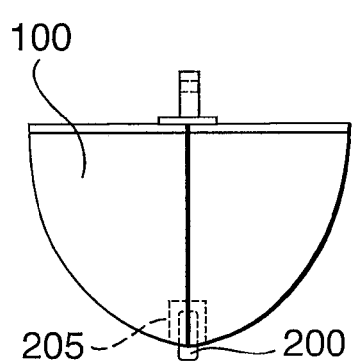
FIG. 5b is a front elevation of the same pontoon.
Figure 5C:
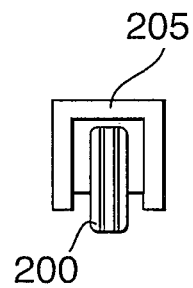
FIG. 5c is a front elevation of the metal angle showing a wheel mounted on an attached axle.
Figure 5E:
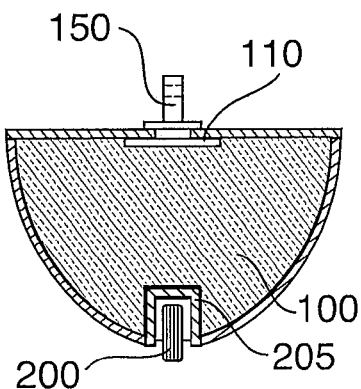
FIG. 5e is a cross-section of the same pontoon along the vertical plane of line AA.
Figure 5D:
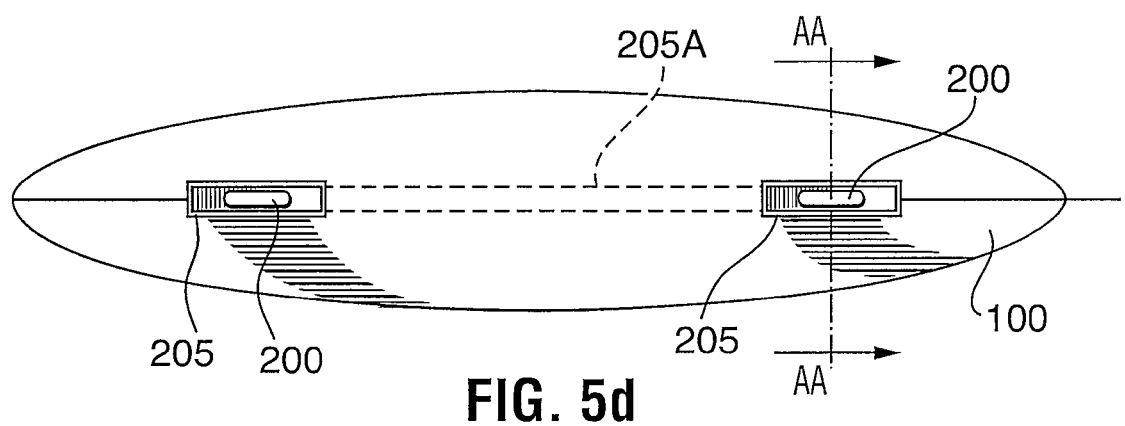
FIG. 5d is a bottom perspective pictorial of the same hull showing two wheels with associated metal angles, and line AA.

Generally, the present invention provides a kit for conversion of a tracked recreational snow vehicle for waterborne use by the addition of pontoons which float the vehicle when on the water, exposing the track to the water to provide for propulsion and utilizing the vehicle's steering gear to move its installed front pontoons to maneuver the vehicle when waterborne.

The kit's components are designed to be mounted to existing or easily implemented mounting points on the vehicle's chassis and steering gear so that the utility of the vehicle can be extended beyond its use on snow, to include its use on water.

Optionally, wheels can be included in its front pontoon(s) in order to provide easy access to and egress from water and land, for instance being drivable on a boat ramp into and out of a lake without special equipment or effort.

Use of the Kit

Installation Proceeds as Follows:

A front ski 10 is removed from the vehicle's steering mount 20 and a pontoon 100 is mounted to the same steering mount 20 using hardware 160 installed at the related reinforced mounting point 110. The hardware 160 need only to be compatible with the steering mount 20 on the vehicle, and to provide the capability of holding the pontoon pointing in the direction of the steering gear, parallel to another pontoon 100 which would also be mounted to the steering mount 20 on the vehicle's opposite side (if the vehicle originally had two skis). The ski removal and pontoon replacement is repeated on the other side of the vehicle should the vehicle have had two skis.

A rearward rear mounting bar 120 and a forward rear mounting bar 125 may be threaded through the vehicle's track 90 or otherwise suitably placed. The rearward rear mounting bar 120 is near to the rearward end 70A of the vehicle's tunnel 70 in a position that will not interfere either with the track 90 or the vehicle's track or rear suspension 80 in its travel or other running gear such as idlers or similar elements (not specifically shown), with the bar 120 aligned so that the attached upper rear mount plates—rearward 176 extend upwardly inside the tunnel 70 to where the upper rear mount holes—rearward 178 align with rearward tunnel mount holes 183 in the tunnel 70 and are attached, for example, by being bolted onto the tunnel 70.

Similarly, the forward rear mounting bar 125 is nearer to the forward end of the tunnel 70B than the rearward end 70A, and will be mounted in a position that will not interfere either with the track 90 or the vehicles rear suspension 80 in its travel, nor with other running gear such as idlers or similar elements (not specifically shown), with the bar 125 aligned so that the attached upper rear mount plates—forward 186 extend upwardly inside the tunnel 70 to where the upper rear mount holes—forward 188 align with forward tunnel mount holes 189 in the tunnel and are attached, for example, be being bolted onto the tunnel 70.

In either bar's case, the system of upper and lower pairs of mount plates attached to each bar, with holes in the mount plates for alignment with the tunnel and the pontoon, can be modified to provide more holes in the upper mount plates and/or the tunnel's walls to provide flexibility in vertical adjustment of the position of the pontoon with respect to the track and the surface of the water when waterborne.

The pontoons can be sized so that all four used on a vehicle are the same size and thus capable of being rotated in the event a mount point 20, 183, 193 on the pontoon is damaged or worn, as well as to simplify manufacture.

The front pontoons will be limited in length to fit the geometry of the vehicle's steering gear and clearances.

Wheels 200 may be fitted to the keel of the pontoons, for example by embedding or mounting an inverted U-shaped metal part 205 or similar wheel carrier in or on the keel of a pontoon, and providing an axle through the wheel 200 affixed at either end to the sides of the U-shaped part 205. The U-shaped part 205 may extend for the length of the keel to provide steering stability, much like a strake or hull element, and could also provide longitudinal rigidity. The wheels and mounts can be removable or demountable.

The hulls of the pontoons can be constructed from thermoplastic sheets formed over appropriate hull-shaped forms, then filled with foam and enclosed by a plastic or metal, but solid, lid. The lid may have structural reinforcement 110 at the mounting points on the pontoon's top surface. The top surface may have an anti-slip surface, and could include in-hull storage (not shown).

In the preceding description, for purposes of explanation, numerous details are set forth in order to provide a thorough understanding of the embodiments of the invention. However, it will be apparent to one skilled in the art that these specific details are not required in order to practice the invention. Well-known structures may be shown in generic form in order not to obscure the nature and working of this invention.

It will be apparent to those knowledgeable about recreational vehicles that the use of this invention can be applicable to wheeled recreational vehicles as well as tracked vehicles, and yet retains its novelty.

The above-described embodiments of the invention are intended to be examples only. Alterations, modifications and variations can be effected to the particular embodiments by those of skill in the art without departing from the scope of the invention, which is defined solely by the claims appended hereto.

LEGEND FOR DRAWINGS

| Number | Feature |
| --- | --- |
| 10 | Ski |
| 20 | Ski Attachment Point |
| 30 | Steerable Front Suspension |
| 40 | Cowling/Nacelle (covers engine, transmission, etc) |
| 50 | Operator Controls (steering, throttle, etc) |
| 60 | Operator/Passenger Seat |
| 70 | Tunnel/Chassis |
| 70A | Rearward end of Tunnel |
| 70B | Forward end of Tunnel |
| 80 | Track or Rear Suspension |
| 90 | Infinite Flexible Track |
| 95 | Track Lugs (traction features, paddles, wear bars, cleats, studs) |
| 100 | Front Float or Pontoon |
| 110 | Reinforced Mounting Points on Pontoons |
| 120 | Rearward Rear Mounting Bar |
| 125 | Forward Rear Mounting Bar |
| 130 | Rear Float or Pontoon |
| 140 | Generic Pontoon (either 100 or 130) |
| 150 | Rear Float or Pontoon Attachment Points |
| 160 | Forward Pontoon Attachment Point |
| 172 | Lower Rear Mount Plate - Rearward |
| 173 | Lower Rear Mount Hole - Rearward |
| 176 | Upper Rear Mount Plate-Rearward |
| 178 | Upper Rear Mount Holes - Rearward |
| 179 | Rearward Tunnel Mount Holes |
| 182 | Lower Rear Mount Plate - Forward |
| 183 | Lower Rear Mount Hole - Forward |
| 186 | Upper Rear Mount Plate - Forward |
| 188 | Upper Reear Mount Holes - Forward |

LEGEND FOR DRAWINGS -continued

| Number | Feature |
| --- | --- |
| 189 | Forward Tunnel Mount Holes |
| 200 | Wheels |
| 205 | U-Shaped metal angle at keel |
| 205A | Optionally full-length U-shaped angle at keel |

What is claimed is:

1. A conversion kit to convert a tracked recreational snow vehicle into a personal watercraft for accommodating a passenger, the vehicle having a front, a rear, two sides, a track, a steering system, vehicle suspension, a tunnel having two sides and a plurality of holes, and at least one ski, the conversion kit comprising:

a. At least one front flotation device to replace the at least one ski to provide buoyancy to the front of the vehicle as well as to provide steering while the vehicle is in motion;

b. A set of rear flotation devices for mounting to the vehicle, the rear flotation devices being mountable rearward of the at least one front flotation device, to provide buoyancy to the rear of the vehicle while leaving at least a portion of a lower part of the track in contact with the water when the vehicle is waterborne, in order that the track is operable to power the vehicle's motion through and over the water; and c. mounting brackets and at least one arm for the rear flotation devices, the mounting brackets being attachable to the tunnel via the holes using the at least one arm, the at least one arm having attached thereto the set of rear flotation devices, the rear flotation devices being parallel to each other and aligned longitudinally with the front-to-rear axis of the vehicle, and the at least one arm being threaded through the track and the vehicle suspension before being attached to the rear flotation devices and the vehicle near the bottom of the tunnel, and the distance between the tunnel and the bottom of the rear flotation devices is adjustable.

2. The kit of claim 1 wherein the at least one front flotation device is equipped with one or more integrated or removable wheels in the at least one front flotation device's lower-most part for amphibious operation, or for ease of loading and unloading the vehicle to and from the water.

3. The kit of claim 1 wherein the at least one front flotation device is pointed at its front-most end, and is of any hydrodynamically useful hull shape or form.

4. The kit of claim 1 further comprising at least one mounting bracket for the at least one front flotation device, wherein the at least one ski is attached to the steering system by mounting elements, and the at least one mounting bracket is designed to be compatible with the mounting elements.

5. The kit of claim 1 where means are included on the at least one arm and/or additional holes are included in the sides of the tunnel, for adjusting the distance between the tunnel and the bottom of the rear flotation devices to adjust the angle of attack of the vehicle and its disposition in the water when idle and in use under powered motion.

6. The kit of claim 1 wherein the at least one arm is made of 2"×2" square aluminum tubing, or of any other suitable material or dimension.

7. The kit of claim 1 where the attaching of the rear flotation devices to the vehicle is accomplished by welding a plate to each side of the at least one arm, the plates spaced to be directly beside the inside vertical wall of the tunnel, one per side, to be bolted to the tunnel through holes in the plates which mate with holes in the tunnel.

8. The kit of claim 1 wherein the front and rear flotation devices are all the same size.

9. The kit of claim 1 wherein the front and rear flotation devices are of different sizes.

10. The kit of claim 1 wherein the front and rear flotation devices each have a hull which is made using any suitable means of making boat hulls.

11. The kit of claim 10 where the hulls are made by thermally setting a plastic to match a mold of the hull's shape, filling the thermally set plastic hull shape with suitable foam, making an upper or lid part of suitable material to seal to the hull shape's upper and outer edges, to provide structural rigidity to the device itself, and to provide mounting points for the hardware by which the device is to be attached to the vehicle.

12. The kit of claim 1 wherein at least one of the front and rear flotation devices has a non-slip top surface for at least a portion of its area.

13. The kit of claim 10 wherein the vehicle further comprises a motor, a passenger seat, and wherein when the kit is installed on the vehicle and when the vehicle is in operation, the vehicle is a watercraft whereby the rear flotation devices provide sufficient buoyancy to hold the vehicle sufficiently out of the water so that, at rest, the lower part of the vehicle's track is in the water and the motor, passenger seat, and passenger are out of the water; and when the vehicle is operated at speed over water, the hull shape of the rear flotation devices may plane or otherwise rise out of the water to some extent, which acts to raise the vehicle and its track with respect to the water's surface in a way which is controlled to keep the track in contact with the water in order to enable the track to provide propulsive power to the vehicle, and control is effected by the initial placement of the rear flotation devices with respect to the vehicle's track, its weight and the displacement of the hull of the rear flotation devices, and the amount of rise or vertical change in location of the front and rear flotation devices with respect to the water surface when the vehicle and hulls are moving in the water at various speeds.

14. A recreational vehicle converted to a personal watercraft through application of the kit of claim 1.

* * * * *